(12) United States Patent
Lecomte et al.

(10) Patent No.: US 6,767,388 B2
(45) Date of Patent: Jul. 27, 2004

(54) PROCESS FOR DEHYDRATING AND FRACTIONATING A LOW-PRESSURE NATURAL GAS

(75) Inventors: Fabrice Lecomte, Rueil Malmaison (FR); Béatrice Fischer, Lyons (FR); Jean-Charles Viltard, Vienne (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 51 days.

(21) Appl. No.: 10/108,860

(22) Filed: Mar. 29, 2002

(65) Prior Publication Data

US 2002/0185006 A1 Dec. 12, 2002

(30) Foreign Application Priority Data

Mar. 29, 2001 (FR) .............................................. 01 04297

(51) Int. Cl.[7] .............................................. B01D 53/14
(52) U.S. Cl. .............................. 95/161; 95/163; 95/166; 95/174; 95/180; 95/193; 95/209; 95/231
(58) Field of Search ........................ 95/161, 163, 165, 95/166, 167, 173, 174, 178, 179, 180, 193, 194, 209, 231

(56) References Cited

U.S. PATENT DOCUMENTS

| | | | | |
|---|---|---|---|---|
| 3,633,338 A | * | 1/1972 | Zahn | |
| 4,775,395 A | * | 10/1988 | Rojey et al. | |
| 4,979,966 A | * | 12/1990 | Rojey et al. | |
| 4,999,031 A | * | 3/1991 | Gerhardt et al. | |
| 5,167,675 A | * | 12/1992 | Rhodes | |
| 5,782,958 A | * | 7/1998 | Rojey et al. | |
| 5,797,981 A | * | 8/1998 | Collin et al. | |
| 5,907,924 A | * | 6/1999 | Collin et al. | |
| 6,001,153 A | * | 12/1999 | Lebas et al. | |
| 6,004,380 A | * | 12/1999 | Landreau et al. | |
| 6,461,413 B1 | * | 10/2002 | Landreau et al. | |
| 2002/0059865 A1 | * | 5/2002 | Lemaire et al. | |
| 2002/0062735 A1 | * | 5/2002 | Lecomte et al. | |
| 2002/0178918 A1 | * | 12/2002 | Lecomte et al. | |
| 2002/0185006 A1 | * | 12/2002 | Lecomte et al. | |

FOREIGN PATENT DOCUMENTS

| | | |
|---|---|---|
| EP | 0362023 | 4/1990 |
| FR | 2605241 | 4/1988 |
| FR | 2787870 | 6/2000 |

\* cited by examiner

Primary Examiner—Duane S. Smith
(74) Attorney, Agent, or Firm—Antonelli, Terry, Stout & Kraus, LLP

(57) ABSTRACT

Process for dehydrating/fractionating a low-pressure wet natural gas containing "heavy" constituents and "light" constituents includes a stage a) in which at least a fraction of the wet gas at temperature $T_0$ is contacted with an aqueous liquid phase L'1 containing methanol, the gas carrying along substantially all of the methanol contained in phase L'1. In a stage b), the gas from stage (a) is cooled to a temperature $T_1$ lower than temperature $T_0$, producing a gas phase G1 at equilibrium with a hydrocarbon-containing liquid phase L1 containing $C_3^+$ and an aqueous liquid phase L'1 containing methanol. In stage c), phase L'1 is sent to stage (a), and in stage d), said phase G1 is fractionated by distillation carried out by continuous thermal exchange with a cooling fluid, so as to extract the "light" constituents (gas phase G2) and the "heavy" constituents (condensed phase L2).

15 Claims, 3 Drawing Sheets

PROCESS FOR DEHYDRATING AND
FRACTIONATING A LOW-PRESSURE
NATURAL GAS

FIELD OF THE INVENTION

The present invention relates to a process for dehydrating and fractionating a low-pressure natural gas.

BACKGROUND OF THE INVENTION

French patent FR-B-2,605,241 describes a process for treating a natural gas or a refinery gas containing water so as to eliminate at least part of the water contained in said gas, wherein:
  a) the gas is contacted with a recycled liquid phase containing water and a solvent (methanol for example); the resulting aqueous liquid phase is discharged and a gas containing, in the vapour state, water and the major part of the solvent is recovered,
  b) said gas is cooled so as to condense a liquid phase essentially consisting of water and solvent, and
  c) the non-condensed gas is separated from this liquid phase, which forms the phase recycled to stage (a).

French patent FR-B-2,787,870 notably describes a process for fractionating a high-pressure natural gas (pressure above about 5 MPa) wherein at least part of the gas is expanded so as to be used as a cooling agent, expansion being carried out before the fractionating operation, and for gas purification (scrubbing), this operation being carried out by means of a technique allowing simultaneously distillation and heat exchange (for example in an exchanger-dephlegmator). This prior document also describes integration of the fractionating process with a dehydration process using methanol.

Now, there are cases where the natural gas, after coming out of the well or passing through various installations or equipments, is at a pressure lower than about 5 MPa. To fractionate these gases (i.e. extract the condensates or NGL), a new process has been discovered which also uses a simultaneous heat exchange and distillation operation (for example in an exchanger-dephlegmator type device) which, integrated with a dehydration stage, affords the advantage of being very simple and of requiring reduced investment costs.

SUMMARY OF THE INVENTION

The invention thus proposes a new process allowing both dehydration and fractionation (stripping) of a low-pressure wet natural gas containing notably hydrocarbon constituents referred to as <<heavy>> constituents ($C_3^+$), hydrocarbon constituents referred to as <<light >> constituents ($C_1$ and $C_2$) and water.

The process of the invention, applied to a low-pressure ($P_0$ below about 5 MPa) we natural gas containing constituents referred to as <<heavy >> constituents and constituents referred to as <<light >> constituents, can generally be defined by the fact that it comprises in combination at least the following stages:
  a) at least a fraction of the wet gas at a temperature $T_0$ is contacted with an aqueous liquid phase L'1 containing methanol, said gas carrying along substantially all of the methanol contained in said aqueous phase L'1,
  b) the gas from stage (a) is cooled to a temperature $T_1$ lower than temperature $T_0$, which produces a gas phase G1 at equilibrium with a hydrocarbon-containing liquid phase L1 containing $C_3^+$ and an aqueous liquid phase L'1 containing methanol,
  c) aqueous liquid phase L'1 is sent to stage (a), and
  d) gas phase G1 is fractionated by distillation carried out by continuous thermal exchange with a cooling fluid, which allows to extract, on the one hand, the <<light) >> constituents in the gas form (phase G2) and, on the other hand, the <<heavy>> constituents in the form of condensates (phase L2).

To carry out the thermal exchange in stage (d), it is possible to use an external cooling fluid such as a propane cycle. However, according to a preferred embodiment of the process of the invention, the cooling fluid consists of gas G2 itself after expansion. In this case, the expanded gas is heated by the thermal exchange of stage (d); it can also be heated by thermal exchange with the gas entering stage (b). It is recompressed thereafter in order to be exported.

More particularly, refrigeration of the gas in stage (b) can be achieved successively with cooling water or an air-cooled exchanger, then by exchange with the cooling fluid of stage (d), and finally, if necessary, by means of an external coolant such as a propane cycle.

Preferred and advantageous embodiments of the process according to the invention are described hereafter.

The hydrocarbon liquid phase L2 formed in stage (d) and comprising mainly $C_3^+$ condensates can also contain lighter hydrocarbons ($C_1$ and $C_2$) and require stabilization. It can then be sent to a stabilization stage (e) in order to obtain stabilized condensates L3 and a gas phase G3, to be fractionated, which is then sent back to fractionating stage (d).

Small amounts of methanol which it may be desirable to recover generally remain in the $C_3^+$ condensates from stage (d) (phase L2) or in the stabilized $C_3^+$ condensates from stabilization stage (e) (phase L3). A condensate washing stage (f) can therefore be carried out using an aqueous phase; the aqueous phase having thus extracted the methanol can then be partly regenerated, in a regeneration stage (g), for example by stripping with the remaining fraction of the initial wet natural gas that has not been contacted with the aqueous liquid phase L'1 in stage (a). The aqueous phase thus partly regenerated in regeneration stage (g) is used again to extract the methanol from the $C_3^+$ condensates in washing stage (f).

In the latter case, after stripping of the methanol, the natural gas fraction considered is mixed with the fraction that has been contacted with the aqueous liquid phase L'1 in stage (a).

During the fractionating stage of the process according to the invention, methanol losses can occur. To compensate for these losses, extra methanol can be added, for example in the gas upstream from cooling stage (b) and/or at the start of the distillation operation of stage (d) and/or during the stage of expansion of gas G2.

DETAILED DESCRIPTION

Figure 1:
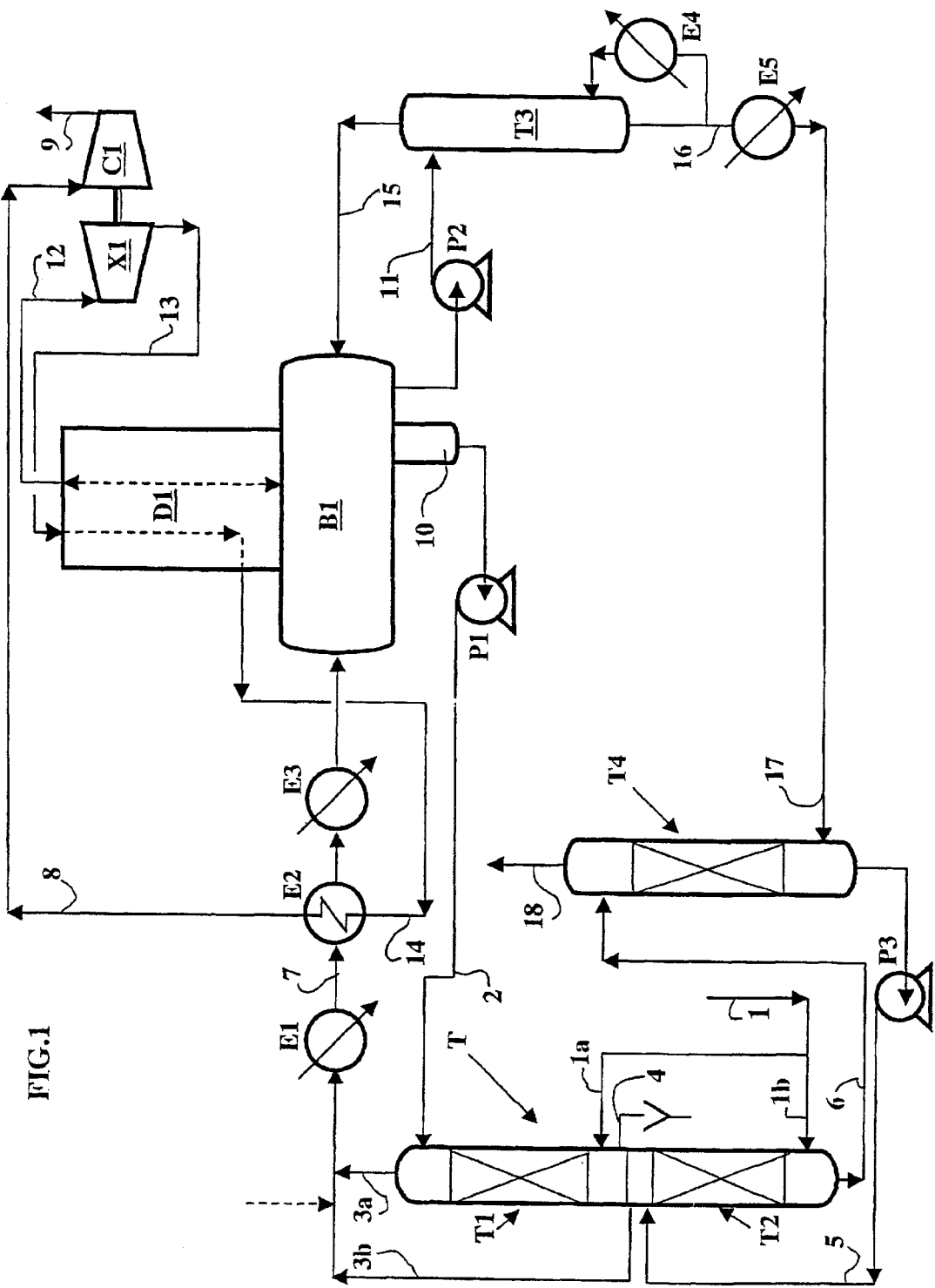
FIGS. 1, 2 and 3 appended hereafter illustrates the process according to the invention including the preferred embodiments described above. The process is described more in detail hereafter in connection with these figures.

The low-pressure (below about 5 MPa) wet gas at a temperature ranging from 0° C. to 60° C., flowing in through line 1, is partly sent through line 1a into the upper section T1 of a stripping column T. At the top of the upper section, an aqueous liquid phase containing methanol delivered by pump P1 from the bottom (<<boot>> 10) of a separating drum B1, described hereunder, is injected through a line 2.

A methanol-enriched gas is extracted at the top of column T through line 3a and an aqueous phase greatly depleted in methanol (generally less than 100 ppm) is extracted in the middle of the column, at the bottom of upper section T1, through a line 4. The other part of the gas flowing in through line 1 is sent through line 1b to lower section T2 of the column to regenerate the methanol-containing wash water coming from condensate wash column T4 (described hereafter) and introduced at the top of lower section T2 through a line 5 coming, through a pump P3, from the bottom of wash column T4.

Methanol-enriched gas is extracted in the upper part of section T2 of the column through a line 3b and methanol-depleted wash water is extracted at the bottom of column T through a line 6 in order to be sent to wash column T4.

The methanol-enriched gases coming from lines 3a and 3b are mixed together and the resulting stream is sent, at temperature $T_0$ and pressure $P_0$, into a heat exchanger E1 where it is cooled by heat exchange, for example with cooling water or sea water, or air. The cooled gas sent through line 7 is then cooled in a second heat exchanger E2. The heat exchange occurs for example with at least part of the scrubbed gas from the fractionating and purification process, described hereafter, this gas circulating through line 14, then line 8. This gas is thereafter compressed in compressor C1 to be exported through line 9. If necessary, after cooling in exchanger E2, this gas can be cooled in an external-coolant exchanger E3, then it is sent to separating drum B1 of a heat exchange-distillation device comprising a dephlegmator D1 with two passes. Drum B1 is provided with a <<boot>> 10 allowing to collect phase L'1 (water+methanol), which is sent to the top of column T by pump P1 and through line 2. A hydrocarbon liquid phase L2 consisting of $C_3^+$ condensates and of part of the $C_1$ and $C_2$ is also separated. This liquid phase L2 is sent by pump P2 and through line 11 to a stabilization column T3. Finally, a gas phase G1 flowing up through the reflux pass of dephlegmator D1 is also separated. In this pass, the condensed liquid flows down into drum B1.

Scrubbed gas G2 flowing out at the top of dephlegmator D1 is sent through line 12 to an expander X1 in which it is expanded. The expanded gas is then sent through line 13 into the second pass of dephlegmator D1 where it circulates downwards and serves as a cold source for the dephlegmator. As it flows down in the dephlegmator, the scrubbed gas warms up. It is then heated, after leaving the dephlegmator through line 14, by heat exchange with the incoming gas in exchanger E2. It is then recompressed by compressor C1 (driven by expander X1) prior to being exported through line 9.

Liquid phase L2, mainly consisting of the condensed $C_3^+$, is sent through pump P2 and line 11 to stabilization column T3, reboiled for example by means of an exchanger E4, a hot-oil exchanger for example. A the top of this column, a gas phase G3 mainly consisting of $C_1$ and $C_2$ is discharged through a line 15 and sent back to drum B1.

At the bottom of column T3, a liquid mixture L3 essentially consisting of $C_3^+$ and containing only a small amount of light products ($C_1$ and $C_2$) is collected through line 16. This stabilized condensate L3 contains methanol that has to be recovered in order to reduce as much as possible the methanol losses in the process. This liquid stream is passed through a heat exchanger E5 arranged after reboiler E4, where it is cooled, then it is fed through line 17 into the lower section of wash column T4. In this column T4, the $C_3^+$ condensates are washed by means of the methanol-depleted water introduced at the top through line 6. The methanol-freed condensate is recovered through line 18 at the top of column T4 and the methanol-containing wash water is recovered at the bottom of the column prior to being sent through pump P3 and line 5 to the lower section T2 of column T, where it is stripped by the gas fed through line 1b into said lower section T2 of said column T.

Extra methanol can be added, if necessary, before cooling stage (b) (dotted arrow in FIG. 1).

Furthermore, gas G2 flowing out of dephlegmator D1 has been considerably cooled and, although it contains methanol, hydrate formation is possible. It can be useful, to prevent clogging risks, to provide an injection of methanol at the inlet of the expander and/or at the top of the distillation pass of the dephlegmator.

In some cases, one is led to inject amounts of methanol that are larger than the amounts that can be discharged with the outgoing effluents of the process (i.e. the scrubbed gas and the condensates). This leads to an accumulation of methanol in liquid hydrocarbon phase L2, this methanol being thereafter found in the wash water recovered at the bottom of column T4, or an accumulation of methanol in the aqueous liquid phase at the bottom of the cold section, in practice at the bottom of separating drum B1. It is then advantageous to carry out an additional stage of methanol recovery.

It is first possible to recover the excess methanol from the condensate wash water.

In this case, the process considered is defined in the same way as the previous dehydration and fractionating process, but it furthermore comprises the following stages.

After condensate washing stage (f), all or part of the water+methanol liquid phase coming from the bottom of wash column T4 is sent to a distillation stage (h) allowing to recover, at the top, practically pure methanol and, at the bottom, a methanol-depleted aqueous liquid phase L'2 which, after cooling, is sent to regeneration stage (g) or recycled to condensate washing stage (f).

Figure 2:
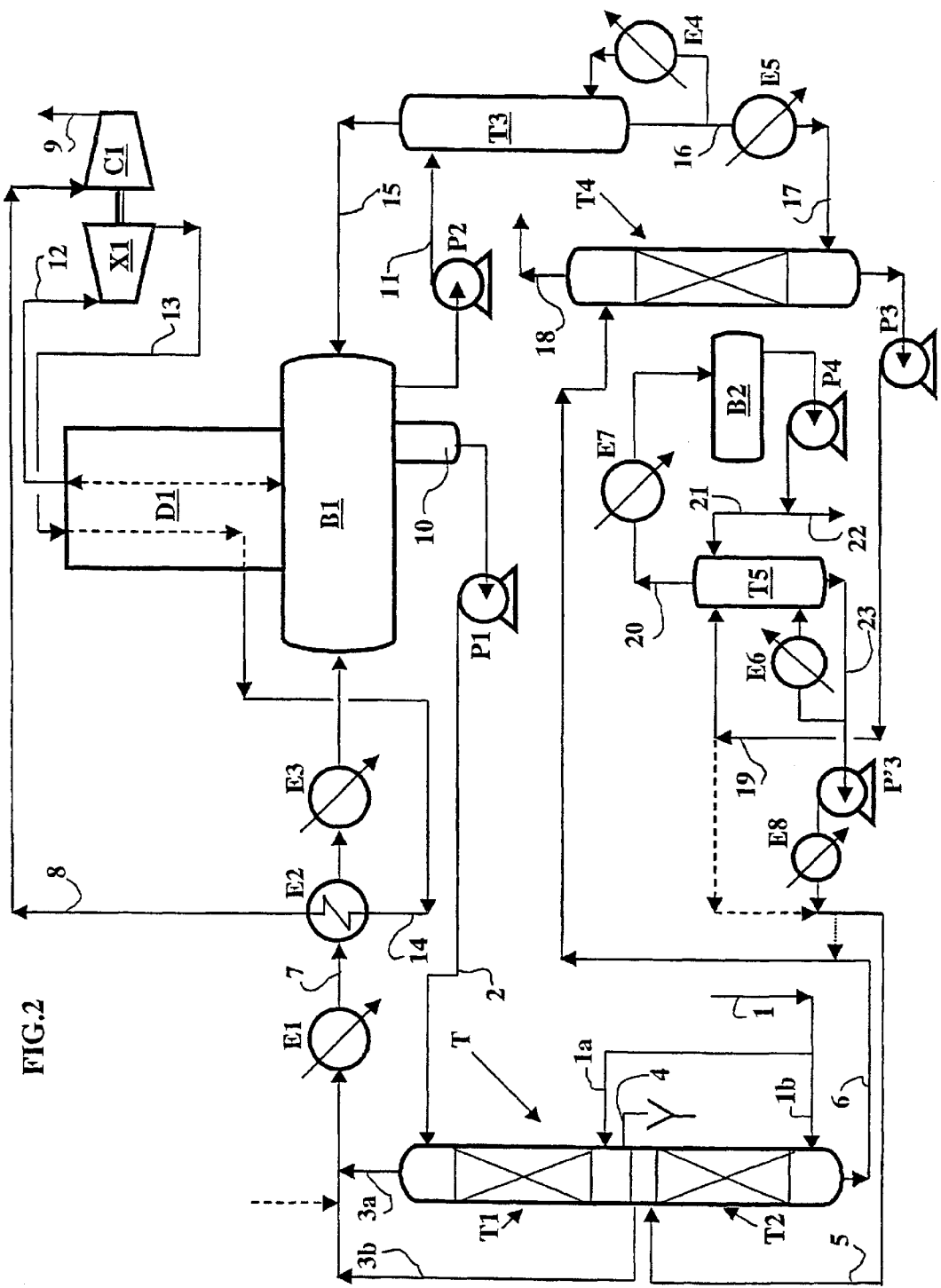

Thus, as illustrated in FIG. 2, all or part of the water+methanol liquid phase coming from the bottom of wash column T4 is sent to a distillation stage wherein practically pure methanol is recovered at the top and sent to a storage point prior to being reinjected at the various cold points of the process. A methanol-depleted water+methanol mixture is also recovered and sent to the top of part T2 of stripping column T.

Thus, as illustrated in FIG. 2, at least part of the water+methanol liquid phase coming from the bottom of wash column T4 is sent no longer to the top of lower section T2 of stripping column T (to be contacted with a fraction of the wet natural gas to be treated), but, through line 19, to distillation column T5, reboiled for example by means of an exchanger E6. The top vapour of column T5, flowing out through line 20, consists of methanol of high purity, for example 95–97% by mole. It is condensed in exchanger E7 and the resulting liquid phase is collected in drum B2. This liquid phase is partly sent by pump P4 through line 21 to the top of column T5 as liquid reflux. The other part is sent through line 22 to a methanol storage point so as to be re-used later, for example reinjected at the various cold points of the process, or used in any other independent process. A liquid phase consisting of a methanol-depleted water+methanol mixture is recovered at the bottom of distillation column T5 and either sent, after cooling in an exchanger E8, through line 23 and pump P'3 to the top of the upper section T2 of stripping column T through line 5, or sent back through line 6 to the top of wash column T4.

It is also possible to recover the excess methanol from the aqueous liquid phase at the bottom of the cold section, in practice at the bottom of separating drum B1.

The process considered in this embodiment of the invention is defined in the same way as the previous dehydration and fractionating process, but it furthermore comprises the following stages.

Before the stage of sending (c) aqueous liquid phase L'1 to stage (a), at least part of aqueous liquid phase L'1 from stage (b) is sent to a distillation stage (h) allowing to collect, at the top, practically pure methanol and, at the bottom, a methanol-depleted aqueous liquid phase L'2 which, in stage (c), is sent to stage (a).

Figure 3:
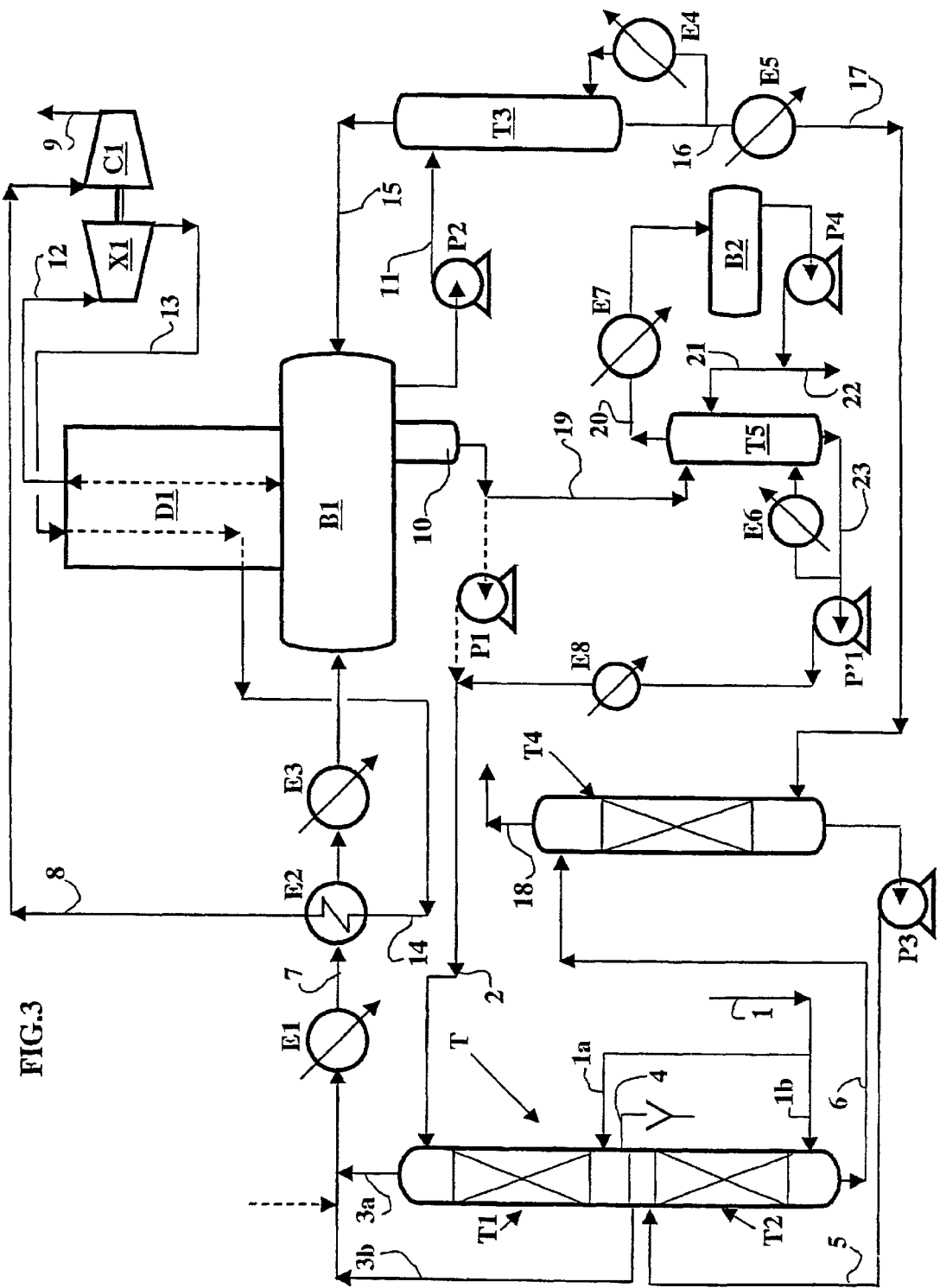

Thus, if we refer to FIG. 3, at least part of the water+ methanol liquid phase coming from the bottom 10 of separating drum B1 and containing excess methanol is sent no longer to the top of stripping column T (to be contacted with the fraction of the wet natural gas to be treated), but through line 19 to distillation column T5, reboiled by means of an exchanger E6 for example. The top vapour of column T5, flowing out through line 20, consists of methanol of high purity, for example 95–97% by mole. It is condensed in exchanger E7 and the resulting liquid phase is collected in drum B2. This liquid phase is partly sent by pump P4 through line 21 to the top of column T5, as liquid reflux. The other part is sent through line 22 to a methanol storage point so as to be re-used later, for example by reinjection at the various cold points of the process, or in any other independent process. A liquid phase consisting of a methanol-depleted water+methanol mixture is collected at the bottom of distillation column T5 and sent through line 23 and pump P'1 to the top of the upper section T1 of stripping column T, as defined above, after cooling in an exchanger E8. Practically pure methanol is separated at the top and sent to a storage point, and a methanol-depleted water-methanol liquid mixture is collected at the bottom. This mixture is sent to stripping column T.

The two particular embodiments described above can be implemented separately or coupled.

The examples given hereafter illustrate the process according to the invention without limiting the scope thereof.

EXAMPLE 1

The wet gas at a temperature of 50° C. and at a pressure of 2.8 MPa flows in through line 1 (see FIG. 2) at a flow rate of 8867 kmol/h Its composition, given in percent by volume, is as follows:

|  |  |
|---|---|
| $Co_2$ | 1.58% |
| Methane | 78.94% |
| Ethane | 9.92% |
| Propane | 4.89% |
| Butanes | 2.39% |
| $C_5^+$ hydrocarbons | 1.44% |
| Water | 0.47% |
| Nitrogen | 0.37%. |

A first fraction of the gas (6207 kmol/h) is sent to upper section T1 of stripping column T. An aqueous liquid phase (83 kmol/h) containing methanol (71% by mole) coming from <<boot>> 10 at the bottom of separating drum B1 is injected at the top of upper section T1. A methanol-enriched (0.95% by mole) gas (6249 kmol/h) is extracted at the top of section T1 and an aqueous phase (40.8 kmol/h) containing 83 ppm by mole of methanol is extracted at the bottom of upper section T1.

The other fraction of the gas (2660 kmol/h) is sent to lower section T2 of stripping column T to regenerate part of the methanol-containing (21.7% by mole) wash water from condensate wash column T4 (28.1 kmol/h), introduced at the top of lower section T2. The other part of the condensate wash water (23 kmol/h) is sent to column T5. The column comprises 15 theoretical plates. A vapour phase containing 99.9% by mole of methanol and 0.1% by mole of water is recovered at the top. This vapour is condensed and sent to the storage point (4.8 kmol/h). An aqueous phase with 99% by mole of water and 1% by mole of methanol (18 kmol/h) is recovered at the bottom of the column and sent to wash column T4.

Methanol-enriched (0.23% by mole) gas is extracted (2665 kmol/h) in the upper part of section T2 of column T and methanol-depleted (15 ppm by mole) wash water is extracted at the bottom of section T2 (23 kmol/h) to be sent to wash column T4.

The methanol-enriched gases from sections T1 and T2 are mixed together and the resulting stream receives extra methanol (FLOW RATE ?). This stream, at a temperature of 44° C. and a pressure of 2.7 MPa, is sent to heat exchanger E1 where it is cooled (with cooling water or sea water) to a temperature of 35° C. The gas is cooled further to a temperature of +1° C. in heat exchanger E2, by exchange with the scrubbed gas from the fractionating and purification process.

After cooling in exchanger E2, the gas is cooled in an external-coolant exchanger E3 to a temperature of −32° C., then it is sent to separating drum B1 of the heat exchange-distillation device comprising a two-pass dephlegmator D1. The water+methanol phase L'1 (71% by mole of methanol) is collected (83 kmol/h) in <<boot>> 10 of separating drum B1 and brought back to a pressure of 2.7 MPa by pump P1 prior to being sent to the top of section T1 of column T. A hydrocarbon liquid phase L2 consisting of $C_3^+$ condensates and of part of the $C_1$ and $C_2$ is also separated (1485 kmol/h). This liquid phase L2 is brought to a pressure of 3.5 MPa by pump P2 and sent to stabilization column T3. Finally, a gas phase G1 flowing up through the reflux pass of dephlegmator D1 is separated (710 kmol/h). In this phase, the condensed liquid flows down towards drum B1. At the top of the reflux pass, methanol is injected at a flow rate of 5 kmol/h.

The scrubbed gas flowing out of the top of dephlegmator D1 is sent to an expander X1 where it is expanded to a pressure of 0.1 MPa. Its temperature is −92° C. Extra methanol is injected at this point at a flow rate of 0.1 mol/h. The expanded gas is sent into the second pass of dephlegmator D1 where it circulates downwards and serves as a cold source for the dephlegmator. As it flows down in the dephlegmator, the scrubbed gas warms up to a temperature of 4° C. It is thereafter heated to 25° C. after leaving the dephlegmator by heat exchange with the incoming gas in exchanger E2. The scrubbed gas is then recompressed to a pressure of 1.4 MPa by compressor C1, driven by expander X1, then to 7 MPa by means of an additional compressor, and finally exported.

The scrubbed gas has the following volume composition:

|  |  |
|---|---|
| $Co_2$ | 1.73% |
| Methane | 87.28% |
| Ethane | 10.88% |
| Propane | 0.11% |
| Methanol | 16 ppm |
| Water | 2 ppm. |

Liquid phase L2 is sent to stabilization column T3, reboiled by means of a hot-oil exchanger E4 to a temperature of 99° C. A gas phase G3 mainly consisting of the $C_1$ and $C_2$ is discharged at the top of this column at a temperature of −16° C. and sent back to drum B1.

A liquid mixture mainly consisting of $C_3^+$ and containing only a small amount of light products ($C_1$ and $C_2$), in particular less than 2% by mole of $C_2$, is collected at the bottom of column T3.

The stabilized condensate collected at the bottom of column T3 contains methanol (1.49% by mole) that has to be recovered to reduce as much as possible methanol losses in the process. This liquid stream is cooled to a temperature of 35° C. in heat exchanger E5 arranged after reboiler E4, then it is introduced into the lower section of wash column T4, where the $C_3^+$ condensates are washed by means of the methanol-depleted water introduced at the top of column T4. The methanol-freed condensate is recovered at the top of column T4 and the methanol-containing wash water, which is recovered at the bottom of the column, is brought by pump Pxto a pressure of 2.7 MPa and partly sent to lower section T2 of column T, where it is stripped by the gas fed into said lower section T2 of said column T (28.1 kmol/h), the other part (23 kmol/h) being sent to column T5 described above.

The condensate recovered has the following mass composition:

| | |
|---|---|
| Ethane | 2.0% |
| Propane | 53.5% |
| Butanes | 27.5% |
| $C_5^+$ hydrocarbons | 17.0% |
| Methanol | 650 ppm |
| Water | 1000 ppm. |

EXAMPLE 2

The layout of Example 1 and its implementation are repeated, but the aqueous liquid phase collected in <<boot>> 10 of separating drum B1 (71 kmol/h) with a methanol concentration of 55% by mole is sent to distillation column T5 for recovery of the methanol (see FIG. 3). The temperature at the bottom of column T5 is 96° C. and the temperature at the top is 81° C. The pressure is 0.2 MPa at the bottom and 0.18 MPa at the level of the condenser. The column comprises 15 theoretical plates.

A vapour phase containing 99% by mole of methanol and 1% by mole of water is collected at the top. This vapour is condensed to a liquid, sent to a storage point. The effluent at the bottom (8.8 kmol/h) is a water-methanol mixture whose methanol concentration is 30% by mole. It is brought to a pressure of 0.28 MPa by pump P'1 and sent to the top of upper section T1 of stripping column T.

What is claimed is:
1. A process for dehydrating and fractionating a low-pressure wet natural gas essentially containing $C_1$ and $C_2$ hydrocarbons referred to as <<light>> hydrocarbons, $C_3^+$ hydrocarbons referred to as <<heavy>> hydrocarbons and water, characterized in that it comprises in combination at least the following stages:
  a) at least a fraction of the wet natural gas at a pressure below about 5 MPa is contacted with an aqueous liquid phase L'1 containing methanol, said gas carrying along substantially all of the methanol contained in said liquid phase L'1,
  b) the gas from stage (a) is cooled, thus producing a gas phase G1 at equilibrium with a hydrocarbon-containing liquid phase L1 containing $C_3^+$ and the aqueous liquid phase L'1 containing methanol,
  c) aqueous liquid phase L'1 is sent to stage (a), and
  d) gas phase G1 is fractionated by distillation carried out by continuous thermal exchange with a cooling fluid, which allows to extract the <<light>> constituents in form of a gas phase G2 and the <<heavy>> constituents in form of a liquid phase L2 containing the $C_3^+$ condensates.

2. A process as claimed in claim 1, characterized in that the cooling fluid used in stage (d) is gas G2 after expansion.

3. A process as claimed in claim 2, characterized in that expanded gas G2, heated in stage (d), is heated further by thermal exchange with the gas reaching stage (b), then recompressed.

4. A process as claimed in claim 1, characterized in that, in stage (b), the gas is successively cooled with cooling water or an air-cooled exchanger, then by thermal exchange with the cooling fluid of stage (d).

5. A process as claimed in claim 4, characterized in that, in stage (b), the gas is also cooled by an external coolant.

6. A process as claimed in claim 1, characterized in that liquid phase L2 is sent to a stabilization stage (e) allowing to obtain stabilized condensates and a gas phase to be fractionated, which is sent to fractionating stage (d).

7. A process as claimed in claim 1, characterized in that extra methanol is added upstream from cooling stage (b), at the top of the dephlegmator and/or at the expander inlet.

8. A process as claimed in claim 1, characterized in that the condensates from stage (d) or the stabilized condensates from stage (e) are washed in a stage (f) by absorption of the methanol by means of an aqueous phase, then regenerated in a stage (g).

9. A process as claimed in claim 8, characterized in that, in stage (g), the aqueous phase having absorbed the methanol is contacted with the fraction of the initial wet natural gas that has not been used in stage (a), so as to be partly regenerated and sent back to washing stage (f).

10. A process as claimed in claim 9, characterized in that the natural gas fraction used in stage (g) is mixed with the fraction used in stage (a).

11. A process as claimed in claim 8, characterized in that at least part of the aqueous liquid phase from washing stage (f) is sent to a distillation stage (h) wherein practically pure methanol is separated at the top and a methanol-depleted water-methanol liquid mixture is collected at the bottom.

12. A process as claimed in claim 11, characterized in that the methanol separated at the top is sent to a storage point and the water-methanol liquid mixture collected at the bottom is sent to stage (g).

13. A process as claimed in claim 11, characterized in that the methanol separated at the top is sent to a storage point and the water-methanol liquid mixture collected at the bottom is recycled to stage (f).

14. A process as claimed in claim 1, characterized in that at least part of the aqueous liquid phase L'1 from stage (b) is sent to a distillation stage (h) wherein practically pure methanol is separated at the top and a methanol-depleted water-methanol liquid mixture is collected at the bottom.

15. A process as claimed in claim 14, characterized in that the methanol separated at the top is sent to a storage point and the water-methanol liquid mixture collected at the bottom is sent to stage (a).

* * * * *